United States Patent [19]

Temple

[11] Patent Number: 4,669,913

[45] Date of Patent: Jun. 2, 1987

[54] METHOD OF RAISING AND EXTENDING AN OCEAN BEACH

[76] Inventor: John Temple, 107 S. Palisades Dr., Signal Mountain, Tenn. 37377

[21] Appl. No.: 781,219

[22] Filed: Sep. 26, 1985

[51] Int. Cl.$^4$ .............................................. E02B 3/04
[52] U.S. Cl. ..................................... 405/15; 405/21; 405/25
[58] Field of Search ................... 405/15, 16, 18–21, 405/23, 25, 29–35, 26–28

[56] References Cited

U.S. PATENT DOCUMENTS

| 919,788 | 4/1909 | Smith | 405/31 |
|---|---|---|---|
| 954,283 | 4/1910 | Hawkes | 405/21 |
| 1,230,608 | 6/1917 | Sheldon | 405/32 |
| 2,069,715 | 2/1937 | Arpin | 405/25 |
| 3,653,216 | 4/1972 | Stickler | 405/33 |
| 3,844,124 | 10/1974 | Tupper | 405/16 |
| 3,844,125 | 10/1974 | Williams | 405/33 |
| 3,888,209 | 6/1974 | Boots | 405/25 X |
| 4,129,006 | 12/1978 | Payne | 405/31 |
| 4,498,805 | 2/1985 | Weir | 405/31 |
| 4,502,816 | 3/1985 | Creter | 405/25 X |

FOREIGN PATENT DOCUMENTS 2393110  2/1979  France ................. 405/30

OTHER PUBLICATIONS

"How to Build a Beach at Economy Prices", Engineering News Record, Sep. 8,1955, pp. 34–36.
"Hungry Beach to Be Nourished by Sand Pumping Plant", Engineering News Record, Frederick Zurmuhlen, Aug. 7, 1958, pp. 46–47.

Primary Examiner—Cornelius J. Husar
Assistant Examiner—Nancy J. Stodola
Attorney, Agent, or Firm—Alan Ruderman

[57] ABSTRACT

A method of forming and extending the width of an existing sand beach at an ocean sea shore by raising the level of the beach. The method includes the construction of a barrier, preferably from concrete, in a configuration having a cross section in the form of a substantially equilateral triangle but with a rounded apex at the top. The barrier is constructed at the low tide water level and the apex is approximately 12 to 18 inches below the high tide water level. As water flows over the barrier to the high tide level sand is deposited on the land side of the barrier and builds up to the level of the apex. The process can be expedited by dredging and pumping sand and sea water over the barrier. As the sand builds up to the level of the apex on the land side sand also is deposited on the ocean side, thereby totally submerging the barrier so that the barrier does not interfere with bathers or sea turtles or the like.

7 Claims, 3 Drawing Figures

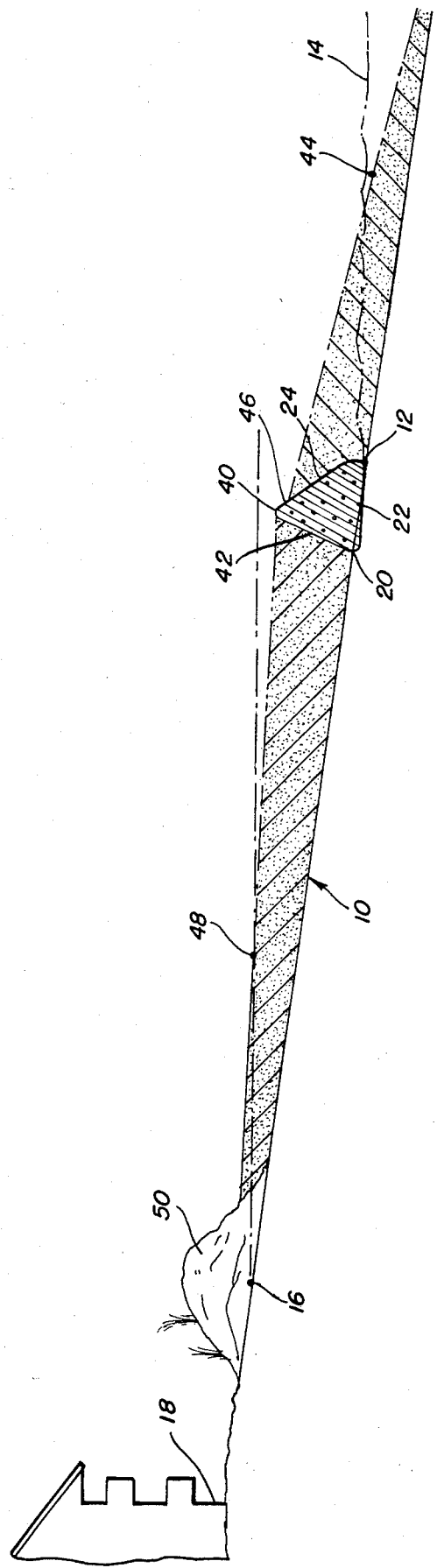
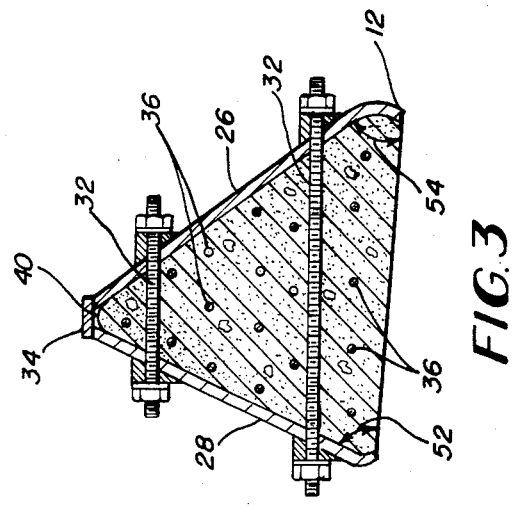
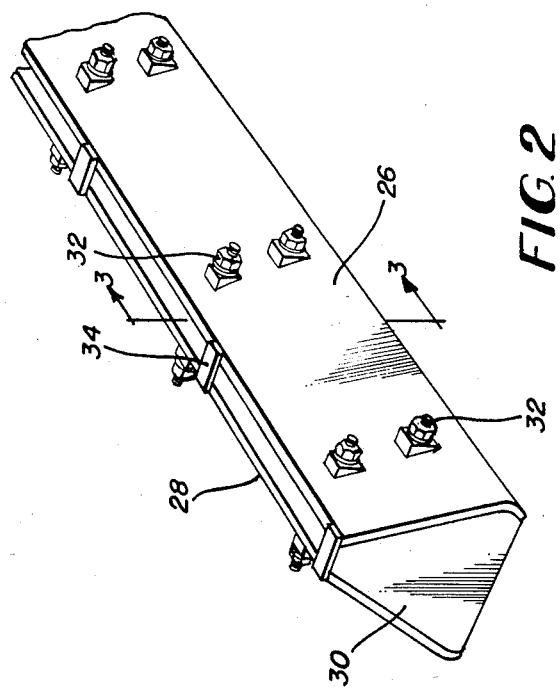
FIG. 1
FIG. 2
FIG. 3

METHOD OF RAISING AND EXTENDING AN OCEAN BEACH

BACKGROUND OF THE INVENTION

This invention relates to a method of retarding the erosion of and the making or extending of an ocean sand beach so as to raise and extend both the high and low tide locations of an existing natural sand beach at an ocean sea shore.

Due to the melting of the polar ice caps and possibly other causes the water level of the oceans has been rising over the last 50 years or more. This, together with the effects of ocean storms, has resulted in extensive erosion of many of the coastal beaches. Enormous financial expenditures are made each year in order to preserve the beaches in the United States, but generally the results of these efforts have been less than adequate. Extensively used are break-waters, which are stone, concrete or asphalt structures that extend from the beach outwardly toward the ocean a substantial distance These are expensive structures which appear to have been built merely to retard the erosion of the beaches where they are built, but have had little affect. In some areas they have been totally ineffective for this purpose. Yearly, especially at resort areas, the coastal waters are dredged in an effort to rebuild the beaches. These efforts have proved to be of a limited and temporary nature. As the ocean ebbs and flows and the waters flow back from the beaches to the ocean small amounts of sand are carried with the waters, thereby gradually reducing the width and thus the height of the beach. In some areas where homes were built some time ago, the water level at high tide is rapidly approaching the walls of these dwellings. Property owners at such locations have seen the value of their properties diminished substantially and spend substantial amounts on retarding this erosion. To date, no effective method has been developed. Moreover, the efforts to date using concrete and/or asphalt sea walls have resulted in interruption of sea turtle nesting and has stymied development in these areas.

SUMMARY OF THE INVENTION

Consequently, it is a primary object of the present invention to provide a method of retarding the erosion of the beaches at the ocean coasts and rebuilding such beaches to higher levels, thereby increasing the width of the beach and moving the high and low tide levels farther away from the existing shore lines.

Accordingly, the present invention provides a method of retarding erosion at beach front property and of actually manufacturing and extending a beach by raising the level thereof. The present inventor has found that by building a barrier along a beach front substantially at the low tide level in the direction in which the beach extends, rather than in a direction extending inwardly from the water to the beach, and then letting the natural ebbing of the ocean and/or dredging and pumping the sand carrying ocean water over the barrier, sand will be deposited until the level of the sand is such that the ocean itself will thereafter carry the sand over the barrier at high tide and the sand will gradually build up to the level of the barrier.

In carrying out the invention it has been found that a barrier having a substantially triangular cross sectional configuration provides the required retaining structure for forming the beach, the length of the barrier being determinative of the length of the extended beach. Specifically, it has been found that ideally a barrier having a substantially equilateral triangular configuration with an apex approximately 12 to 18 inches below the high tide level and placed on the beach at the original low tide level provides excellent results, the disposition of the seaward facing wall of the barrier being such that the base and the seaward facing wall intersect substantially at or near the original low tide mark. To satisfy the environmentalists, the apex of the barrier should be convexly arcuate and a sand dune should be placed on certain beaches at the original high tide level so as not to hurt sea turtles or interrupt their nesting.

In constructing the barrier at the low tide level, molds may be set up along the beach, reenforced with rods and concrete poured in the usual manner. After the concrete has set and the molds removed, sea water ebbing to the high tide level will deposit sand beyond the barrier, but is preferred that to increase the build up of the beach through a dredging operation, sand and sea water may be pumped or otherwise channeled over the barrier to the land or beach side of the barrier and the sand within the sea water is thus rapidly deposited. This can be even further expedited by dredging additional sand from the ocean and pumping it over the barrier. When the tide comes in, additional sand is deposited on the beach side of the barrier until the sand is built up to the level of the apex of the barrier. As the sand builds up to form an increase in the beach level, it has been found that the sand also builds up along the seaward facing side of the barrier against the seaward facing wall and gradually tapers downwardly away from the barrier, a slight recess or eddy being formed adjacent the barrier apex.

In this manner a beach may be raised and extended some distance and once formed the process, if desired, may be repeated so as to extend the beach further out toward the ocean.

BRIEF DESCRIPTION OF THE DRAWINGS

The particular features and advantages of the invention as well as other objects will become apparent from the following description taken in connection with the accompanying drawings in which:

FIG. 1 is a diagrammatic elevational view partly in cross section illustrating a beach formed and extended by the principles of the present invention;

FIG. 2 is a perspective view of a portion of a form used for pouring concrete for providing the barrier illustrated in FIG. 1; and FIG. 3 is a cross sectional view taken along line 3—3 of FIG. 2 after the concrete has been poured.

DESCRIPTION OF THE PREFERRED EMBODIMENT

Referring to the drawings, FIG. 1 illustrates an existing sand beach extended by the method performed in accordance with the principles of the present invention, the beach 10 having an original width extending from a low tide level 12 of the ocean 14 to a high tide level 16. Under normal natural evolution, as aforesaid, the width of beaches have been eroding and narrowing both due to the rising ocean level and storm damage. As this occurs the ocean has been coming closer in to shore and to structures, such as building 18, along the beach front. As the ocean rises and then recedes it carries sand back away from the beach as the ocean ebbs from high tide to low tide. The sand remains somewhat suspended in the water and as the tide comes in some of it is temporarily deposited and is then carried back out by the ocean.

The present invention utilizes the natural ebb and flow of the ocean to extend the beach by the installation of a barrier 20 substantially at the low tide mark. The barrier is preferably in the form of a substantially triangular shaped structure having curved apexes with the base 22 of the triangle being disposed along the shore line and with the intersection of the seaward facing wall 24 and the base 22 being substantially at the original low tide mark 12. The barrier 20 preferably is formed from reenforced concrete so as to have substantial strength and weight.

In the process of forming the barrier, forming molds may be constructed as illustrated in FIG. 2 having wall forms 26, 28 rounded at their lower ends and an end cap 30 at each end of the molding forms. The length of the forms will depend on the length of the beach to be extended, but it appears that long beaches may be constructed using forms in sections of about 20 feet in length. The forms may be strengthened by tie-rods 32 and possibly braces 34 for maintaining the wall forms 26, 28 at the proper spacing. Steel reenforcing rods 36 should extend the length of the forms and are inserted prior to the pouring of the concrete in a conventional manner, preferably preformed and welded to the tie rods 32 to expedite assembly of the forms. Once the concrete has been poured and can stand up, the top apex 40 of the barrier may be rounded convexly so as not to injure endangered species such as sea turtles. After the concrete has set the molds are dissassembled from the barrier at the next low tide. The barrier, rather than constructed directly on the beach, if desired, may be constructed in sections on land and then brought onto the beach where they can be connected together in interlocking abutting relationship.

The configuration of the triangular barrier 20 is preferably one having substantially equal angles so as to provide a substantially stable structure. It appears desirable, however to have the angles at the base slightly different from the 60° of a true equilateral triangle for purposes of resisting the forces on the barrier by the ocean as high tide sets in. For example, the angle 52 may be approximately 65° while the angle 54 may be 55°. The height of the apex 40 above the base or above the level of the beach adjacent the walls as the barrier settles should be approximately in the range of at least 12 inches to 18 inches below the high tide water level so that the water may readily flow over the top of the barrier yet deposit sand on the beach between the landward facing wall 42 and the originally high tide mark. As the tide goes out this sand will build up on the beach and the level of the beach will eventually reach that of the apex 40 of the barrier. Moreover, sand also is deposited gradually adjacent the seaward facing wall 22 in a gradual slope toward the sea to a new low tide mark 44, a small eddy 46 however being formed just adjacent the wall 24 at and slightly below the apex 40. On the beach side of the barrier the level of the beach builds up so that a new high tide water mark 48 is attained on the formed beach at a point gradually sloping from the top 40 of the barrier 20.

In order to expedite the build up of the beach, rather than awaiting the periodic ebbing and flowing of the water, once the barrier is set in place, it is desirable to dredge sand from off-shore and pump sea water and sand over the barrier to the land facing side in an amount about 40% in excess of that required to reach a beach-side level with the barrier wall. This sand to be used to construct appropriate sand dunes 50 with the remainder being deposited on both sides of the barrier wall by the natural ebbing of the tide. In this manner, the beach wall is virtually completely submerged by sand on both sides and moves both the high and low tide levels an average of 200 feet farther from the original shore line, but this distance depends on the natural incline of the original beach. The normal ocean movement at high tide will thereafter aid in the process as described above.

After the beach has been raised as aforesaid some amount of sand should be moved by some form of earth moving equipment to provide the sand dune 50 at and beyond the original high tide level so as to prevent disturbing or interupting the nesting of sea turtles where present.

Once a beach has been raised in this manner, the process may be repeated by placing another barrier at the new low tide level 44. In this manner the beach may be widened and raised even further a number of times where practicable.

The cost of widening and extending a beach by this process is substantially less than the cost presently expended for beach erosion, is substantially more effective and substantially longer lasting. Consequently, the present invention solves a long standing problem to which extensive effort and financial resources have been expended. The solution provided by the present method is not only effective, but is relatively inexpensive in comparison to the methods proposed in the prior art.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A method of forming and extending the width of an existing sand beach at the ocean seashore by raising the level of the beach, said method comprising, locating the low tide and the high tide water level at the beach, and constructing a solid reinforced concrete barrier laterally along the beach, said barrier having a substantially equilateral triangular cross sectional configuration having an apex at the top thereof, a base at the bottom thereof and a seaward facing wall, said constructing of the barrier comprising the steps of:

(a) locating the intersection of the base and the seaward facing wall substantially at the existing low tide water level, and (b) disposing said apex above the level of the beach to a height more than 12 inches and a maximum of approximately 18 inches below the high tide water level, whereby sand is deposited on the high tide side of the beach when water approaches and recedes from the high tide level.

2. A method of forming and extending the width of an existing sand beach as recited in claim 1, including pumping seat water from the ocean over the barrier toward the high tide side of the beach.

3. A method of forming and extending the width of an existing sand beach as recited in claim 1, wherein said apex is arcuately convex.

4. A method of forming and extending the width of an existing beach as recited in claim 1, wherein said constructing of said barrier includes:
  (c) disposing a pair of spaced apart wall forms on the beach,
  (d) positioning an edge of one of said forms substantially at the low tide water level, and inclining the remainder of that wall form toward the high tide side of the beach,
  (e) positioning the other of said forms spaced from said one form toward the high tide side of the beach and inclining said other form so that the space between said forms on the beach is larger than the space between the remainder of the forms,
  (f) inserting reinforcing rods intermediate said pair of forms, and
  (g) pouring concrete in the space between said forms to fill the space to a level more than 12 inches below the high tide water level but to a maximum of approximately 18 inches below the high tide water level,
whereby the intersection of said base and seaward facing wall is substantially at the existing low tide level, and said apex extends above the beach more than 12 inches and a maximum of approximately 18 inches below the high tide water level.

5. A method of forming and extending the width of an existing sand beach as recited in claim 4, wherein said concrete is reenforced with steel rods.

6. A method of forming and extending the width of an existing sand beach as recited in claim 1, including dredging sand from off shore and pumping sea water and sand from the ocean over the barrier toward the high tide side of the beach.

7. A method of forming and extending the width of an existing sand beach as recited in claim 1, including thereafter repeating the steps recited so as to further extend the beach at least once more.

* * * * *